April 15, 1930.  W. H. KAPPES  1,754,794
CLUTCH
Filed Nov. 21, 1927   2 Sheets-Sheet 1

INVENTOR.
WILLIAM H. KAPPES,
BY
Murray and Gugelter
ATTORNEYS.

April 15, 1930.  W. H. KAPPES  1,754,794
CLUTCH
Filed Nov. 21, 1927  2 Sheets-Sheet 2
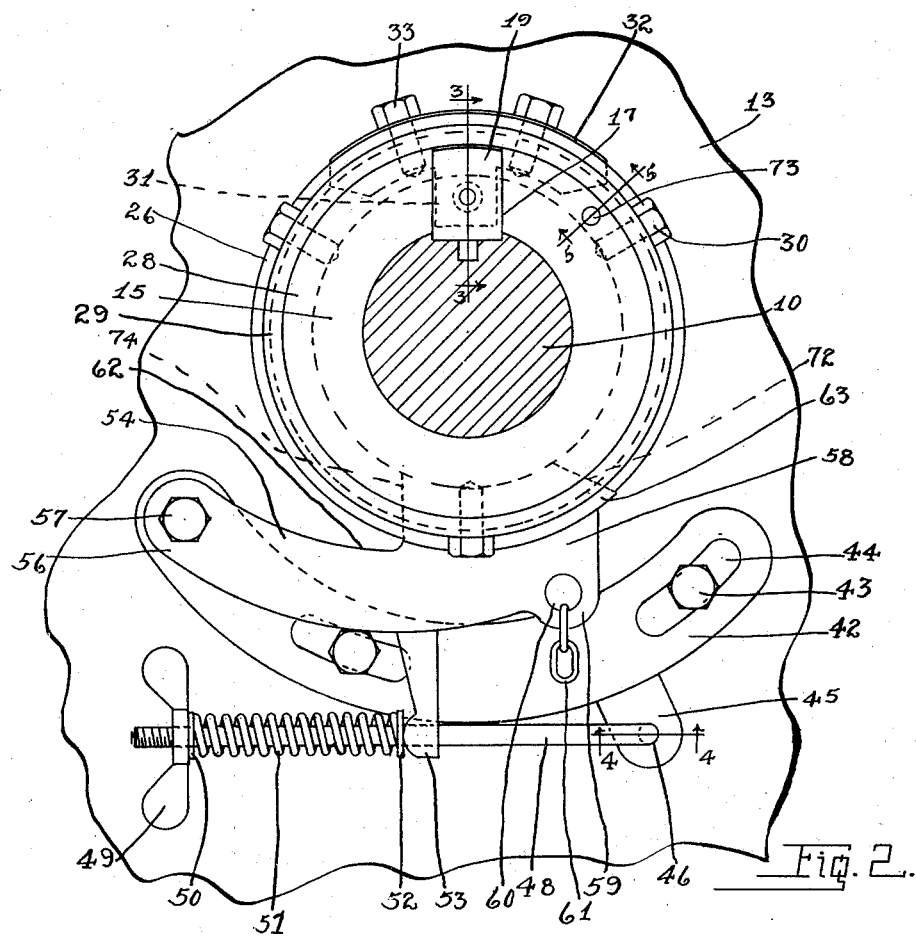
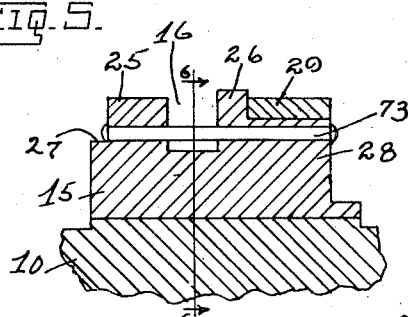
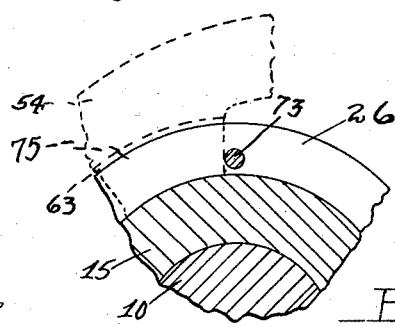
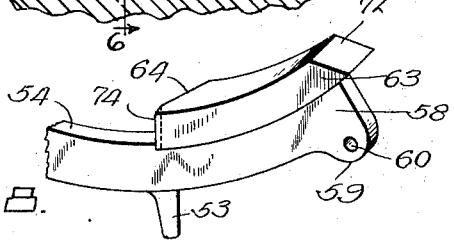
INVENTOR.
WILLIAM H. KAPPES,
BY
ATTORNEYS.

Patented Apr. 15, 1930

1,754,794

UNITED STATES PATENT OFFICE

WILLIAM H. KAPPES, OF CINCINNATI, OHIO, ASSIGNOR TO THE VERDIN, KAPPES & VERDIN COMPANY, OF CINCINNATI, OHIO, A CORPORATION OF OHIO

CLUTCH

Application filed November 21, 1927. Serial No. 234,617.

An object of this invention is to provide an improved driven clutch member for punch presses and the like wherein the driven clutch member will make one or more revolutions and stop as desired.

Another object of this invention is to provide a clutch that is sturdy of construction and is less liable to be broken or damaged than are the clutches now generally used.

Another object of this invention is to provide a clutch of the projecting pin or projecting latch type that is simple of construction and wherein the pin or projecting member can be readily replaced should it become broken.

Another object of this invention is to provide an improved clutch member wherein the clutch block is received in a slot, wherein the walls of the slot support the clutch block and prevent it from twisting and binding in the slot or way when brought into contact with the operating dog.

Another object of this invention is to provide a safety catch or means for stopping the driven shaft when the said driven shaft does not stop upon disengagement of the clutch members. This means may also be termed a warning means as it gives a definite warning when the connection between the driven shaft and driving means is not working satisfactorily.

These and other objects are attained by the means described herein and disclosed in the accompanying drawings, in which:

Fig. 2 is a fragmental sectional view taken on line 2—2 of Fig. 1.

Fig. 5 is a fragmental sectional view taken on line 5—5 of Fig. 2.

Fig. 6 is a fragmental sectional view taken on line 6—6 of Fig. 5.

Fig. 8 is a detail view of a part of the operating arm illustrating the inclined face for coaction with the clutch block.

Figure 1:
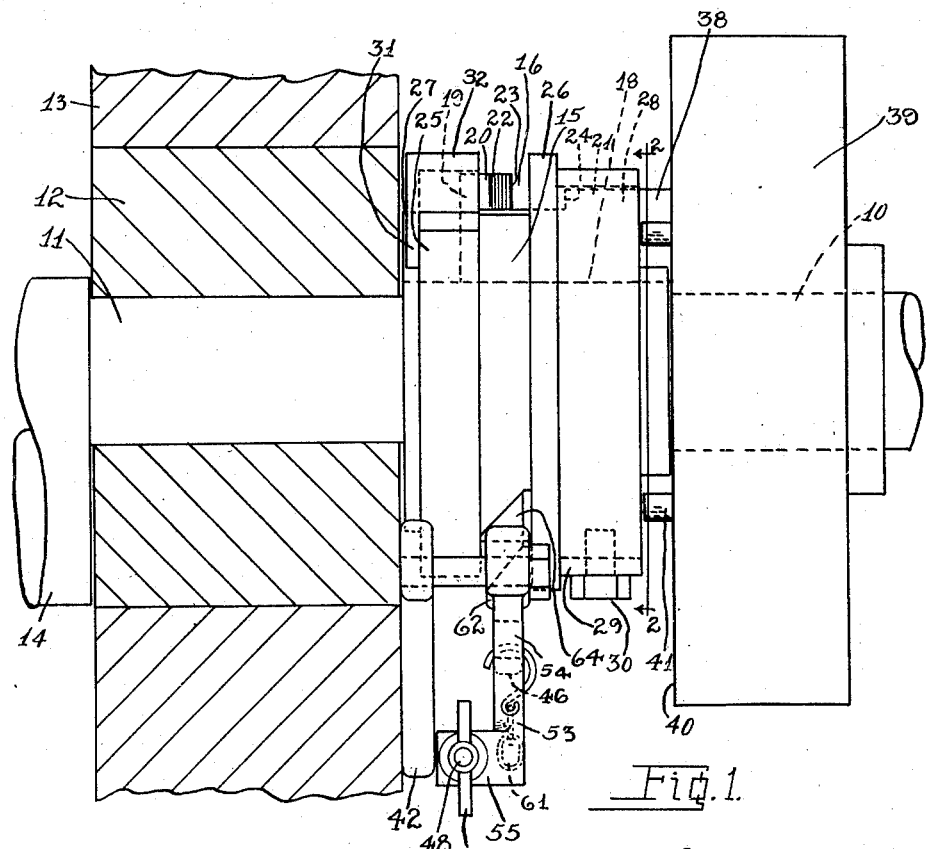
Fig. 1 is a side elevation of a clutch embodying this invention, showing said clutch mounted upon a driven shaft.
Figure 4:
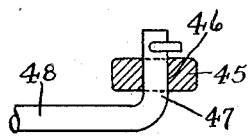
Fig. 4 is a fragmental sectional view taken on line 4—4 of Fig. 2.

The main driven shaft 10 is provided with a reduced bearing portion 11 which is received in a suitable bearing block 12 carried by the frame 13 of a punch press or the like. The driven shaft 10 is provided on one side of the bearing 11 with an eccentric 14 to which the ram or the like is secured, and on the other side of the said bearing 11 with an integral enlarged collar or carrier 15.

The carrier 15 is provided with a circumferential groove 16 and a longitudinal slot or way 17. The slot 17 is rectangular in shape and extends across the groove 16 having its base 18 below the base of the groove and receives the clutch element or block 19. The clutch block 19 has a pair of lugs 20 and 21 of unequal height, the longer lug 20 having its face inclined, as shown at 22. The distance between the innermost edge 23 of the inclined face 22 and the innermost edge 24 of the lug 21 is equal to the width of the circumferential groove 16. The side walls 70 and 71 of the longitudinal slot 17 are closely adjacent the sides of the clutch block 19 and serve to support the clutch block when it is brought into engagement with the shoe 63. In some constructions now in use the clutch block or pin would partially turn and bind in the slot thereby preventing the smooth operation of the clutch block. The carrier 15 is flanked on either side of the groove with flanges 25 and 26 respectively from which extend reduced collars 27 and 28 respectively. The collar 28 has a ring 29 encircling it which provides the upper wall for retaining the block 19 in the slot 17, the ring being secured to the collar by suitable screws, bolts or the like 30. The edges of the reduced collar 28 and of the ring 29 are equally distant from the flange 26, and it is beyond these edges that the clutch block is projected for operative connection with a suitable driving member, which will be described in detail later. The opposite end of the slot 17 is closed by a depending lug 31 carried by a segmental ring 32 which is secured to the flange 25 by suitable bolts or the like 33.

Figure 3:
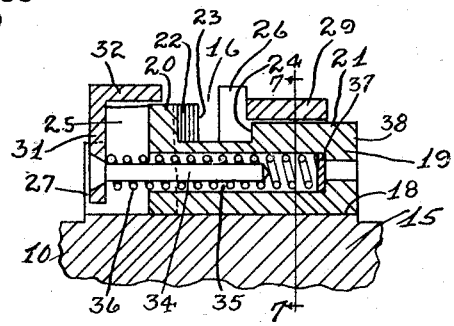
Fig. 3 is a fragmental sectional view taken on line 3—3 of Fig. 2.

A pin 34 is carried by the depending lug 31 and extends into a bore 35 formed in the clutch block 19. An expansion coil spring 36 surrounds the pin 34 and has its one end in abutment with the lug 31 and its other end in abutment with a plug 37 placed at the end of the bore 35, see Fig. 3. The expansion spring 36 tends to hold the forward end 38 of the clutch block 19 beyond the edges of the ring 29 and collar 28 in the path of the driving member.

The driving member 39 may be a pulley, flywheel or gear receiving its power from any given source and loosely mounted on the driven shaft 10 adjacent the carrier 15. The driving member is constantly driven and has extending from its inner face 40 one or more pins 41 which engage the end 38 of the clutch block 19 when the said clutch block is in its projected position.

The frame 13 has secured to it a segmental bracket 42 by suitable bolts or the like 43 which extend through arcuate perforations 44 into the said frame 13. The bracket 42 has depending from it, near one end, an ear 45 provided with a perforation 46 which receives the hooked end 47 of a spring lever 48. The lever 48 has its free end threaded and receives a nut 49 which in conjunction with a washer 50 forms one abutment for an expansion spring 51 which surrounds the lever 48. The other end of the spring 51 abuts a washer 52 contacting a lug 53 depending from an operating arm 54. The lug 53 has an offset portion 55 with a perforation therein through which the lever 48 passes; it is against this offset portion that one end of the spring and washer 52 abut. The operating arm 54 has one end 56 pivotally mounted at 57 to one end of the bracket 42. The free end 58 of the arm 54 is provided with a depending ear 59 having a perforation 60 therein for receiving a suitable operating medium such as the chain 61. On the upper surface 62 and at one end thereof the arm 54 is provided with a shoe 63 which extends into the groove 16 in the carrier 15. The shoe 63 is provided at one end with an inclined face 64 which co-operates with the inclined face 22 formed on the clutch block 19 for retracting such clutch block from its operative position. The other end of the shoe 63 is tapered, as shown at 72, so that when the shaft is rotated in the reverse direction, for instance while setting the machine, the shoe 63 and arm 54 are dislodged from the groove 16 to prevent damaging the clutch block.

The carrier 15 has a pin 73 extending through it and across the circumferential groove 16. The pin 73 is positioned beyond the clutch block 19 so as to engage the shoe 63 after it has passed the clutch block. This would happen for example, when the shaft 10 would not stop after the clutch block 19 had been disengaged from the pin 41 and the shaft continued to revolve.

The operation of the device is as follows: the drawings show the clutch block 19 to be in operative engagement with the pin 41 carried by the driving member 39. This driving engagement will continue to exist until the inclined faces 22 and 64 carried by the clutch block 19 and shoe 63 respectively are brought into engagement whereupon the clutch block 19 will be shifted to the left, as seen in Fig. 1, and the driving engagement broken. The main driven shaft 10 will remain stationary until the shoe 63 is removed from the groove 16 in the carrier 15 whereupon the spring 36 projects the end 38 of the clutch block 19 beyond the edge of the ring 29 and collar 28 into the path of the pin carried by the driving member 39. As soon as the pin 41 engages the end 38 of the block 19 a driving connection is established and the shaft 10 rotated. The shoe 63 is removed from the groove 16 by applying power to or by a draft upon the chain or the like 61 for actuating the arm 54 about its pivotal mounting 57. The power is generally immediately removed from the chain or the like 61 whereupon the expansion spring 51 reinserts the shoe 63 into the groove 16 in advance of the clutch block 19. Upon the engagement of the inclined faces on the clutch block and shoe the clutch block is retracted and the driving engagement between the driving member and the main driven shaft broken.

In the event that the driving connection between the shaft 10 and the driving member 39 is not broken upon the retraction of the clutch block, due for instance to lack of lubrication and the sticking of the driving member to the shaft, the end 74 of the shoe 63 would engage the pin 73 and hold the carrier member 15 and the shaft 10; this is shown in dotted lines at 75 in Fig. 6. The engagement of the end 74 of the clutch shoe with the pin 73 in most cases will break the driving connection between the driving means and the shaft. The impact of the face 74 with the pin 73, in any event, would warn the operator that his machine is not working properly and needs attention. It should be noted that in the normal working of the machine the shoe 63 could not contact the pin 73 because the shaft 10 would stop before the shoe would reach the pin 73, and when the shoe is withdrawn from the groove 16 the pin is beneath or beyond the shoe before it is again inserted into the groove.

It should also be noted the walls 70 and 71 of the transverse slot 17 support the clutch block 19 upon engagement with the shoe 63 to prevent it from turning and binding in the said slot. This insures the clutch block remaining in its proper position so as to smoothly and efficiently reciprocate in the slot.

This clutch is generally used with punch presses wherein the driven shaft generally makes one revolution and stops. This is effected, as described above, by a draft or pull on the chain 61 and releasing it. If however it is desired that the shaft make more than one revolution it is only necessary to withhold the shoe 63 from the groove 16 until it is desired to stop the driven shaft.

If the clutch block 19 becomes damaged or broken and it is desired to replace it the following steps would be taken. The driving member 39 would be shifted to the right, as seen in Fig. 1, for a distance somewhat greater than the width of the ring 29. The screws or bolts 30 would then be removed and the ring moved toward the driving member 39. The slot 17 is now exposed and the clutch block 19 may be removed from the slot. The same operation would be required in order to renew a spring 36 should it become broken.

Figure 7:
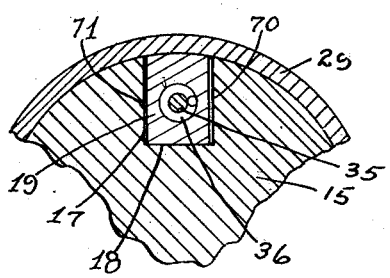
Fig. 7 is a fragmental sectional view taken on line 7—7 of Fig. 3.

The driven clutch member now generally used for a punch press and the like has a reciprocable pin which is received in a cylindrical barrel filled with heavy grease. In cold weather and after periods of rest this grease congeals thereby preventing the smooth operation of the reciprocable pin, sometimes causing it to be broken or damaged. Another objection to this device is that air binds are formed in the cylindrical housing containing the pin thereby preventing it from being sufficiently projected to properly engage the driving pin. All of these objections have been overcome by the device described above. It will be noted, see Fig. 7, that the slot 17, containing the clutch block 19, is sufficiently spaced from the walls to prevent air binds therein and that the slot or way 17 is sufficiently large to prevent serious interference with the operation of the block even through the grease did congeal.

What is claimed is:

1. In a device of the class described the combination of a constantly revolving driving pin, a retractible clutch block adapted to be engaged by the driving pin, the clutch block having formed thereon an inclined face, a bracket, an arm pivotally mounted on the bracket, a shoe having an inclined face carried by the arm, the inclined face on the shoe being complementary to the inclined face carried by the clutch block and normally in engagement with the face on the clutch block to keep said clutch block in a retracted position, a lug on the arm, a floating lever having one end pivotally connected to the bracket, a nut on the free end of the lever, a spring carried by the lever and having its opposite ends in abutment on the lug and on the nut yieldingly resisting movement of the arm about its pivotal mounting and yieldingly resisting separation of the inclined faces.

2. In a device of the class described the combination of a constantly revolving driving pin, a carrier member having a circumferential groove and longitudinal slot therein, a clutch block within the slot having a bore therein, a cap secured to the carrier and closing one end of the slot and overhanging a portion of the top of said slot, a pin carried by the cap and extending into the bore in the clutch block, a spring surrounding the pin and having its opposite ends in abutment upon the cap and clutch block for projecting the clutch block into the path of the driving pin, and means operable within the circumferential groove for retracting the clutch block.

3. In a device of the class described the combination of a shaft, a driving member loosely mounted on the shaft, a carrier member secured to the shaft, the carrier member having a circumferential groove and a longitudinal slot therein, a clutch block reciprocably mounted in the slot, and adapted to be projected into the path of the driving member, a clutch shoe within the groove for retracting the clutch block and normally breaking the driving connection between the clutch block and driving member and normally inoperative means fixed in the circumferential groove for co-operation of the clutch shoe to arrest the shaft in the event of abnormal binding of the driving means therewith.

4. In a device of the class described the combination of a carrier member having a longitudinal slot therein, a clutch block reciprocably mounted in the slot, means for reciprocating the clutch block in the slot, the walls of the slot supporting the clutch block and preventing it from turning and binding in the slot upon engagement with the reciprocating means and independently removable members secured to the carrier for closing the top of the slot at the opposite ends of the slot.

5. In a device of the class described the combination of a carrier, collars on opposite sides of the carrier, the carrier and collars having a way therethrough, a clutch block reciprocably mounted in the way, a removable ring surrounding one of the collars for closing the top of the way at one end thereof and a segmental ring removably mounted on the other of said collars and closing the top of the way at its other end, a depending flange on said segmental ring closing the end of the way and means supported on said depending flange for yieldingly projecting the clutch block beyond the other end of the way.

In testimony whereof, I have hereunto subscribed my name this 10th day of November, 1927.

WILLIAM H. KAPPES.